(12) United States Patent
Rezaei et al.

(10) Patent No.: US 9,443,018 B2
(45) Date of Patent: *Sep. 13, 2016

(54) SYSTEMS AND METHODS FOR CREATING, NAVIGATING, AND SEARCHING INFORMATIONAL WEB NEIGHBORHOODS

(71) Applicant: NetSeer, Inc., Mountain View, CA (US)

(72) Inventors: Behnam Attaran Rezaei, Santa Clara, CA (US); Alice Hwei-Yuan Meng Muntz, Pacific Palisades, CA (US)

(73) Assignee: NetSeer, Inc., Mountain View, CA (US)

( * ) Notice: Subject to any disclaimer, the term of this patent is extended or adjusted under 35 U.S.C. 154(b) by 101 days.

This patent is subject to a terminal disclaimer.

(21) Appl. No.: 14/457,693

(22) Filed: Aug. 12, 2014

(65) Prior Publication Data

US 2014/0351237 A1 Nov. 27, 2014

Related U.S. Application Data

(63) Continuation of application No. 11/625,279, filed on Jan. 19, 2007, now Pat. No. 8,825,657.

(60) Provisional application No. 60/761,011, filed on Jan. 19, 2006.

(51) Int. Cl.
*G06F 7/00* (2006.01)
*G06F 17/30* (2006.01)
*G06N 7/00* (2006.01)

(52) U.S. Cl.
CPC ..... *G06F 17/30864* (2013.01); *G06F 17/3089* (2013.01); *G06F 17/30589* (2013.01); *G06F 17/30958* (2013.01); *G06F 17/30985* (2013.01); *G06N 7/00* (2013.01)

(58) Field of Classification Search
None
See application file for complete search history.

(56) References Cited

U.S. PATENT DOCUMENTS

| | | | |
|---|---|---|---|
| 5,581,764 A | 12/1996 | Fitzgerald et al. | |
| 5,721,910 A | 2/1998 | Unger et al. | |
| 5,956,708 A | 9/1999 | Dyko et al. | |
| 6,038,560 A | 3/2000 | Wical | |
| 6,098,064 A | 8/2000 | Pirolli et al. | |
| 6,233,575 B1 | 5/2001 | Agrawal et al. | |
| 6,242,273 B1 | 6/2001 | Goodwin et al. | |

(Continued)

FOREIGN PATENT DOCUMENTS

| | | |
|---|---|---|
| CN | 101278257 A | 10/2008 |
| EP | 1891509 A2 | 2/2008 |

(Continued)

OTHER PUBLICATIONS

Roychowdhury et al., Scalable Percolation Search in Power Law Networks, Jun. 2004, Department of Electrical Engineering, University of California, Los Angeles, pp. 1-13.*

(Continued)

*Primary Examiner* — Michael Hicks
(74) *Attorney, Agent, or Firm* — Nixon Peabody LLP

(57) ABSTRACT

Systems and methods for the creation of hierarchical networks of overlapping informational web neighborhoods using percolation crawling. Each neighborhood comprises a set of closely linked pages that share a common set of concepts and intent and purpose. The neighborhoods represent web pages that share a common set of underlying concepts and semantic associations. Each such neighborhood can be semantically tagged.

22 Claims, 3 Drawing Sheets

Domain-specific web neighborhood determination methodology

Context finding methodology in information web neighborhood without seed information

(56) References Cited

U.S. PATENT DOCUMENTS

| | | | |
|---|---|---|---|
| 6,339,767 B1 | 1/2002 | Rivette et al. | |
| 6,397,682 B2 | 6/2002 | Kumar et al. | |
| 6,446,061 B1* | 9/2002 | Doerre et al. | 707/738 |
| 6,544,357 B1 | 4/2003 | Hehmann et al. | |
| 6,549,896 B1* | 4/2003 | Candan et al. | |
| 6,665,837 B1* | 12/2003 | Dean et al. | 715/234 |
| 6,816,884 B1 | 11/2004 | Summers | |
| 6,826,553 B1 | 11/2004 | DaCosta et al. | |
| 6,886,129 B1* | 4/2005 | Raghavan et al. | 715/205 |
| 7,031,308 B2 | 4/2006 | Garcia-Luna-Aceves et al. | |
| 7,051,023 B2 | 5/2006 | Kapur et al. | |
| 7,092,953 B1 | 8/2006 | Haynes | |
| 7,181,438 B1 | 2/2007 | Szabo | |
| 7,269,253 B1 | 9/2007 | Wu et al. | |
| 7,483,711 B2 | 1/2009 | Burchfiel | |
| 7,590,589 B2 | 9/2009 | Hoffberg | |
| 7,613,851 B2 | 11/2009 | Rice et al. | |
| 7,660,855 B2 | 2/2010 | Arning et al. | |
| 7,680,796 B2 | 3/2010 | Yeh et al. | |
| 7,689,493 B1 | 3/2010 | Sullivan et al. | |
| 7,716,060 B2 | 5/2010 | Germeraad et al. | |
| 7,725,467 B2 | 5/2010 | Yamamoto et al. | |
| 7,725,475 B1 | 5/2010 | Alspector et al. | |
| 7,725,525 B2 | 5/2010 | Work | |
| 7,730,063 B2 | 6/2010 | Eder | |
| 7,805,536 B1 | 9/2010 | Kompella et al. | |
| 7,818,191 B2 | 10/2010 | Lutnick et al. | |
| 7,822,745 B2 | 10/2010 | Fayyad et al. | |
| 7,831,586 B2 | 11/2010 | Reitter et al. | |
| 7,885,987 B1 | 2/2011 | Lee | |
| 7,958,120 B2 | 6/2011 | Muntz et al. | |
| 7,984,029 B2 | 7/2011 | Alspector et al. | |
| 7,996,753 B1 | 8/2011 | Chan et al. | |
| 8,024,372 B2 | 9/2011 | Harik et al. | |
| 8,050,965 B2 | 11/2011 | Hellevik et al. | |
| 8,301,617 B2 | 10/2012 | Muntz et al. | |
| 8,370,362 B2 | 2/2013 | Szabo | |
| 8,380,721 B2 | 2/2013 | Attaran Rezaei et al. | |
| 8,412,575 B2 | 4/2013 | Labio et al. | |
| 8,417,695 B2 | 4/2013 | Zhong et al. | |
| 8,468,118 B2 | 6/2013 | Kim et al. | |
| 8,825,654 B2 | 9/2014 | Muntz et al. | |
| 8,825,657 B2 | 9/2014 | Attaran Rezaei et al. | |
| 8,838,605 B2 | 9/2014 | Muntz et al. | |
| 8,843,434 B2 | 9/2014 | Attaran Rezaei et al. | |
| 2001/0037324 A1 | 11/2001 | Agrawal et al. | |
| 2001/0049688 A1 | 12/2001 | Fratkina et al. | |
| 2002/0016782 A1 | 2/2002 | Cooper | |
| 2002/0049792 A1 | 4/2002 | Wilcox et al. | |
| 2002/0080180 A1 | 6/2002 | Mander et al. | |
| 2002/0087884 A1 | 7/2002 | Shacham et al. | |
| 2002/0091846 A1 | 7/2002 | Garcia-Luna-Aceves et al. | |
| 2002/0143742 A1 | 10/2002 | Nonomura et al. | |
| 2003/0046307 A1 | 3/2003 | Rivette et al. | |
| 2003/0115191 A1 | 6/2003 | Copperman et al. | |
| 2003/0187881 A1 | 10/2003 | Murata et al. | |
| 2003/0217139 A1 | 11/2003 | Burbeck et al. | |
| 2003/0217140 A1 | 11/2003 | Burbeck et al. | |
| 2003/0220866 A1 | 11/2003 | Pisaris-Henderson et al. | |
| 2003/0227479 A1 | 12/2003 | Mizrahi et al. | |
| 2004/0024739 A1 | 2/2004 | Copperman et al. | |
| 2004/0064438 A1* | 4/2004 | Kostoff | 707/1 |
| 2004/0080524 A1 | 4/2004 | Yeh et al. | |
| 2004/0085797 A1 | 5/2004 | Mei et al. | |
| 2004/0093328 A1 | 5/2004 | Damle | |
| 2004/0122803 A1 | 6/2004 | Dom et al. | |
| 2004/0133555 A1 | 7/2004 | Toong et al. | |
| 2004/0170328 A1 | 9/2004 | Ladwig et al. | |
| 2004/0267638 A1 | 12/2004 | Giunta | |
| 2005/0010556 A1 | 1/2005 | Phelan | |
| 2005/0021461 A1 | 1/2005 | Flake et al. | |
| 2005/0021531 A1* | 1/2005 | Wen et al. | 707/100 |
| 2005/0033742 A1 | 2/2005 | Kamvar et al. | |
| 2005/0055321 A1 | 3/2005 | Fratkina et al. | |
| 2005/0064618 A1 | 3/2005 | Brown et al. | |
| 2005/0065980 A1 | 3/2005 | Hyatt et al. | |
| 2005/0086260 A1 | 4/2005 | Canright et al. | |
| 2005/0097204 A1 | 5/2005 | Horowitz et al. | |
| 2005/0113691 A1 | 5/2005 | Liebschner | |
| 2005/0114198 A1 | 5/2005 | Koningstein et al. | |
| 2005/0114763 A1 | 5/2005 | Nonomura et al. | |
| 2005/0117593 A1 | 6/2005 | Shand | |
| 2005/0138070 A1 | 6/2005 | Huberman et al. | |
| 2005/0144065 A1 | 6/2005 | Calabria et al. | |
| 2005/0144162 A1 | 6/2005 | Liang | |
| 2005/0160107 A1 | 7/2005 | Liang | |
| 2005/0182755 A1 | 8/2005 | Tran | |
| 2005/0203838 A1 | 9/2005 | Zhang et al. | |
| 2005/0210008 A1 | 9/2005 | Tran et al. | |
| 2005/0210027 A1* | 9/2005 | Aggarwal et al. | 707/6 |
| 2005/0222900 A1 | 10/2005 | Fuloria et al. | |
| 2005/0256905 A1 | 11/2005 | Gruhl et al. | |
| 2005/0256949 A1 | 11/2005 | Gruhl et al. | |
| 2005/0283461 A1 | 12/2005 | Sell et al. | |
| 2006/0004703 A1 | 1/2006 | Spivack et al. | |
| 2006/0041548 A1 | 2/2006 | Parsons et al. | |
| 2006/0047649 A1 | 3/2006 | Liang | |
| 2006/0080422 A1 | 4/2006 | Huberman et al. | |
| 2006/0085408 A1 | 4/2006 | Morsa | |
| 2006/0106793 A1 | 5/2006 | Liang | |
| 2006/0106847 A1 | 5/2006 | Eckardt, III et al. | |
| 2006/0112105 A1 | 5/2006 | Adamic et al. | |
| 2006/0112111 A1 | 5/2006 | Tseng et al. | |
| 2006/0168065 A1 | 7/2006 | Martin | |
| 2006/0171331 A1 | 8/2006 | Previdi et al. | |
| 2006/0184464 A1 | 8/2006 | Tseng et al. | |
| 2006/0209727 A1 | 9/2006 | Jennings, III et al. | |
| 2006/0212350 A1 | 9/2006 | Ellis et al. | |
| 2006/0218035 A1 | 9/2006 | Park et al. | |
| 2006/0235841 A1 | 10/2006 | Betz et al. | |
| 2006/0242017 A1 | 10/2006 | Libes et al. | |
| 2006/0271564 A1* | 11/2006 | Meng Muntz et al. | 707/100 |
| 2006/0294155 A1 | 12/2006 | Patterson | |
| 2007/0025364 A1 | 2/2007 | Kodialam et al. | |
| 2007/0033103 A1 | 2/2007 | Collins et al. | |
| 2007/0038614 A1 | 2/2007 | Guha | |
| 2007/0061300 A1 | 3/2007 | Ramer et al. | |
| 2007/0143329 A1 | 6/2007 | Vigen | |
| 2007/0174255 A1 | 7/2007 | Sravanapudi et al. | |
| 2007/0203903 A1 | 8/2007 | Attaran Rezaei et al. | |
| 2007/0239534 A1 | 10/2007 | Liu et al. | |
| 2007/0245035 A1 | 10/2007 | Attaran Rezaei et al. | |
| 2007/0300152 A1 | 12/2007 | Baugher | |
| 2008/0033932 A1 | 2/2008 | DeLong et al. | |
| 2008/0065483 A1 | 3/2008 | Ball | |
| 2008/0086592 A1 | 4/2008 | Stephani | |
| 2008/0104061 A1 | 5/2008 | Rezaei | |
| 2008/0232809 A1 | 9/2008 | Beshai et al. | |
| 2008/0256061 A1 | 10/2008 | Chang et al. | |
| 2008/0301033 A1 | 12/2008 | Singh et al. | |
| 2009/0043648 A1 | 2/2009 | Mahdian et al. | |
| 2009/0046678 A1 | 2/2009 | Lee et al. | |
| 2009/0086663 A1 | 4/2009 | Ho et al. | |
| 2009/0157855 A1 | 6/2009 | Adam et al. | |
| 2009/0168768 A1 | 7/2009 | Chiabaut et al. | |
| 2009/0265475 A1 | 10/2009 | Fujita | |
| 2009/0281900 A1 | 11/2009 | Rezaei et al. | |
| 2009/0296719 A1 | 12/2009 | Maier et al. | |
| 2009/0300009 A1 | 12/2009 | Rezaei et al. | |
| 2011/0113032 A1 | 5/2011 | Boscolo et al. | |
| 2011/0276563 A1 | 11/2011 | Sandoval et al. | |
| 2013/0046797 A1 | 2/2013 | Muntz et al. | |
| 2013/0046842 A1 | 2/2013 | Muntz et al. | |
| 2013/0073546 A1 | 3/2013 | Yan et al. | |
| 2013/0198191 A1 | 8/2013 | Lara Hernandez et al. | |

(56) References Cited

U.S. PATENT DOCUMENTS

| | | |
|---|---|---|
| 2014/0040184 A1 | 2/2014 | Benissan |
| 2014/0067535 A1 | 3/2014 | Rezaei et al. |
| 2015/0262255 A1 | 9/2015 | Khajehnouri et al. |

FOREIGN PATENT DOCUMENTS

| | | |
|---|---|---|
| WO | WO/2006/121575 A2 | 11/2006 |
| WO | WO/2007/084616 A2 | 7/2007 |
| WO | WO/2007/084778 A2 | 7/2007 |
| WO | WO/2007/100923 A2 | 9/2007 |

OTHER PUBLICATIONS

Weikum et al., "Towards Self-Organizing Query Routing and Processing for Peer-to-Peer Web Search", DELIS-TR-0287, 2005.*
Chao et al., "Tag Mechanisms Evaluated for Coordination in Open Multi-Agent Systems", ESAW 2007, LNAI 4995, pp. 254-269, 2008, Springer-Verlag Berlin Heidelberg.*
Calado et al., Combining Link-Based and Content-Based Methods for Web Document Classifications, CIKM'03, pp. 394-401, ACM, 2003.*
Bagrow, J. P. et al., "A Local Method for Detecting Communities," Physical Review E, vol. 72, No. 4, 2005, 046108, pp. 1-16.
Bollobas, B., "Random Graphs," Second Edition, Cambridge University Press, United Kingdom, 2001, Chapter 1 and 2, pp. 1-59.
Boscolo, R., et al., "Functionality Encoded in Topology? Discovering Macroscopic Regulatory Modules from Large-Scale Protein-DNA Interaction Networks," Reprint arXiv:q-bio/0501039, Jan. 2005.
Calado, P., et al., "Combining Link-Based and Content Based Methods for Web Document Classifications," CIKM'03, pp. 394-401, ACM, 2003.
Chao, I. et al., "Tag Mechanisms Evaluated for Coordination in Open Multi-Agent Systems," ESAW 2007, LNAI 4995, Springer-Verlag Berlin Heidelberg, 2008, pp. 254-269.
Chung, F. et al., "The Small World Phenomenon in Hybrid Power Law Graphs," Lect. Notes Phys., vol. 650, 2004, pp. 89-104.
Clauset, A. et al., "Finding Community Structure in Very Large Networks," Physical Review, vol. 70, No. 6, Dec. 2004, 066111.
Erdos, P. et al., "On the Evolution of Random Graphs," Publication of the Mathematical Institute of the Hungarian Academy of Sciences, vol. 5, 1960, pp. 343-347.
Erdos, P. et al., "On the Strength of Connectedness of a Random Graph," Acta Mathematica Scientia Hungarica, vol. 12, Nos. 1-2, 1961, pp. 261-267.
Flake, G. W. et al., "Self-Organization and Identification of Web Communities," IEEE Computer Society, vol. 35, Issue 3, Mar. 2002, pp. 1-7.
Franceschetti M. et. al., "Navigation in Small World Networks, a Scale-Free Continuum Model," Jul. 2003, pp. 1-9.
Franceschetti et. al., "Closing the Gap in the Capacity of Wireless Networks Via Percolation Theory," Oct. 26, 2004, IEEE, pp. 1009-1018.
Garton, L., et al., "Studying On-Line Social Networks," Doing Internet Research, Edited by S. Jones, Thousand Oaks, Calif., 1999, pp. 75-105.
Girvan, M. et al., "Community Structure in Social and Biological Networks," PNAS, vol. 99, No. 12, Jun. 2002, pp. 7821-7826.
Golbeck, "Accuracy of Metrics for Inferring Trust and Reputation in Semantic Web-based Social Networks," Apr. 2004, pp. 1-11.
Gonzalez-Barahona, J. M. et al., "Community Structure of Modules in the Apache Project," MSR '05: Proceedings of the 2005 International Workshop on Mining Software Repositories, 2005.
Jiang, et al., "Monotone Percolation and the Topology Control of Wireless Networks", California Institute of Technology, Electrical Engineering Dept, 0-7803-8968-9/05, 2005, pp. 327-338.
Kernighan, B. W. et al., "An Efficient Heuristic Procedure for Partitioning Graphs," The Bell System Technical Journal 49, Feb. 1970, pp. 291-307, 5 pages.

Kini et. al., "Fast and efficient randomized flooding on lattice sensor networks", Nov. 19, 2004, Drexel University, pp. 1-33.
Kong et al., "Collaborative Spam Filtering Using E-Mail Networks", Aug. 2006, IEEE, pp. 67-73.
Lyons, R. et al., "Probability on Trees and Networks," Apr. 17, 2005, pp. 1-45.
Manku, G. S. et. al., Know thy Neighbor's Neighbor: the Power of Lookahead in Randomized P2P Networks, STOC'04, Jun. 2004, pp. 1-10.
Newman, M. E. J., "Coauthorship Networks and Patterns of Scientific Collaboration," PNAS, vol. 101, Apr. 2004, pp. 5200-5205.
Newman, M. E. J., "Fast Algorithm for Detecting Community Structure in Networks," Physical Review E 69, Jun. 2004, pp. 066133.1-066133.5.
Newman, M.E.J. et al. "Finding and Evaluating Community Structure in Networks," Physical Review E, vol. 69, 026113, 2004, pp. 1-16.
Newman, et al., "Scaling and percolation in the small-world network model", Sante Fe Institute, May 6, 1999, pp. 1-12.
Newman, M.E.J., "Random Graphs as Models of Networks", SFI Working Paper: 2002-02-005, 2002, pp. 1-36.
Owczarek, A. L. et. al., "Generalised Percolation Probabilities for the Self-Dual Potts Model," J. Phys. A: Math. Gen. 20, Apr. 1987, pp. 5263-5271.
Page, L. et al., "The PageRank Citation Ranking: Bringing Order to the Web," Technical Report, Stanford InfoLab, 1999, pp. 1-17.
Patch, K., "Simple search lightens Net load," TRN, Sep. 2004, pp. 1-3.
Pons, P. et al., "Computing Communities in Large Networks Using Random Walks," ArXiv Condensed Matter e-prints, Dec. 2004, 20 pages.
Pothen, A. et al., "Partitioning Sparse Matrices with Eigenvectors of Graphs," Society of Industrial and Applied Mathematics, SIAM Journal on Matrix Analysis and Applications, vol. 11, No. 3, Jul. 1990, pp. 430-452.
Radicchi, F. et al., "Defining and Identifying Communities in Networks," PNAS, vol. 101, No. 9, Mar. 2004, pp. 2658-2663.
Rives, A. W. et al., "Modular Organization of Cellular Networks," PNAS, vol. 100, No. 3, Feb. 2003, pp. 1128-1133.
Sarshar, N. et al., "Scalable Percolation Search in Power Law Networks," Jun. 2004, Department of Electrical Engineering, University of California, Los Angeles, pp. 1-13.
Scott, J. "Social Network Analysis: A Handbook," 2nd Edition, Sage Publications, London, 2000, Chapter 4, pp. 63-81.
Silverberg, et al., "A Percolation Model of Innovation in Complex Technology Spaces", Sep. 2002, MERIT-Infonomics Research Memorandum Series, pp. 1-24.
Wang, G., "Web Search with Personalization and Knowledge", 2002 Proceedings of the IEEE Fourth International Symposium on Multimedia Software Engineering (MSE '02).
Wasserman, S., "Social Network Analysis: Methods and Applications," Cambridge University Press, Cambridge, England, 1994, pp. 17-20 and Chapter 7, pp. 249-290.
Weikum, G. et al., "Towards Self-Organizing Query Routing and Processing for Peer-to-Peer Web Search", DELIS-TR-0287, 2005, 19 pages.
Wellman, B. et al., "Computer Networks as Social Networks: Collaborative Work, Telework, and Virtual Community," Annual Reviews Sociology, vol. 22, No. 1, 1996, pp. 213-238.
Wu, F. et al., "Finding Communities in Linear Time: a Physics Approach," The European Physical Journal B, vol. 38, No. 2, 2004, pp. 331-338.
Zachary, W. W. "An Information Flow Model for Conflict and Fission in Small Groups," Journal of Anthropological Research, vol. 33, No. 4, Winter, 1977, pp. 452-473.
Zou et al., "Email Virus Propagation Modeling and Analysis", Univ. of Mass., Dept. of Electrical and Computer Engineering, Dept of Computer Science, 2004, TR-CSE-03-04, pp. 1-17.
Office Action in U.S. Appl. No. 11/125,329, mailed Jun. 24, 2009.
Amendment and Response to Office Action in U.S. Appl. No. 11/125,329, filed Dec. 22, 2009.

(56) References Cited

OTHER PUBLICATIONS

Office Action in U.S. Appl. No. 11/125,329, mailed Mar. 30, 2010.
Amendment and Response to Office Action in U.S. Appl. No. 11/125,329, filed Sep. 30, 2010.
Notice of Allowance in U.S. Appl. No. 11/125,329, mailed Feb. 2, 2011.
Preliminary Amendment in U.S. Appl. No. 13/098,870, filed Dec. 19, 2011.
Notice of Allowance in U.S. Appl. No. 13/098,870, mailed Jun. 28, 2012.
Office Action in U.S. Appl. No. 13/660,940, mailed Jan. 6, 2014.
Amendment and Response to Office Action in U.S. Appl. No. 13/660,940, filed Apr. 7, 2014.
Notice of Allowance in U.S. Appl. No. 13/660,940, mailed Jun. 13, 2014.
Office Action in U.S. Appl. No. 13/660,955, mailed Jan. 8, 2014.
Amendment and Response to Office Action in U.S. Appl. No. 13/660,955, filed Apr. 7, 2014.
Notice of Allowance in U.S. Appl. No. 13/660,955, mailed Jun. 16, 2014.
Response to Restriction Requirement and Amendment in U.S. Appl. No. 11/624,674, mailed Sep. 29, 2009.
Office Action in U.S. Appl. No. 11/624,674, mailed Mar. 15, 2010.
Amendment and Response to Office Action in U.S. Appl. No. 11/624,674, mailed Jun. 15, 2010.
Office Action in U.S. Appl. No. 11/624,674, mailed Sep. 21, 2010.
After Final Response to Office Action and Request for Reconsideration in U.S. Appl. No. 11/624,674, mailed Nov. 19, 2010.
Advisory Action in U.S. Appl. No. 11/624,674, mailed Feb. 15, 2011.
Amendment and Response to Office Action in U.S. Appl. No. 11/624,674, mailed Oct. 21, 2011.
Office Action in U.S. Appl. No. 11/624,674, mailed Dec. 20, 2011.
Proposed Amendment and Response to Office Action in U.S. Appl. No. 11/624,674, mailed May 16, 2012.
Amendment and Response to Office Action in U.S. Appl. No. 11/624,674, mailed May 21, 2012.
Notice of Allowance in U.S. Appl. No. 11/624,674, mailed Oct. 12, 2012.
Preliminary Amendment in U.S. Appl. No. 11/625,279, filed May 31, 2007.
Office Action in U.S. Appl. No. 11/625,279, mailed Mar. 18, 2009.
Amendment and Response to Office Action in U.S. Appl. No. 11/625,279, filed Sep. 18, 2009.
Office Action in U.S. Appl. No. 11/625,279, mailed Dec. 8, 2009.
Amendment and Response to Office Action in U.S. Appl. No. 11/625,279, filed Mar. 2, 2010.
Office Action in U.S. Appl. No. 11/625,279, mailed May 13, 2010.
Amendment and Response to Office Action in U.S. Appl. No. 11/625,279, filed Aug. 13, 2010.
Office Action in U.S. Appl. No. 11/625,279, mailed Oct. 25, 2010.
Office Action in U.S. Appl. No. 11/625,279, mailed Sep. 16, 2011.
Amendment and Response to Office Action in U.S. Appl. No. 11/625,279, filed Apr. 15, 2011.
Amendment and Response to Office Action in U.S. Appl. No. 11/625,279, filed Mar. 16, 2012.
Office Action in U.S. Appl. No. 11/625,279, mailed Apr. 17, 2012.
Amendment and Response to Office Action in U.S. Appl. No. 11/625,279, filed Oct. 17, 2012.
Office Action in U.S. Appl. No. 11/625,279, mailed Feb. 12, 2013.
Amendment and Response to Office Action in U.S. Appl. No. 11/625,279, filed Aug. 12, 2013.
Final Office Action in U.S. Appl. No. 11/625,279, mailed Oct. 3, 2013.
Amendment and Response to Office Action in U.S. Appl. No. 11/625,279, filed Jan. 3, 2014.
Notice of Allowance in U.S. Appl. No. 11/625,279, mailed Apr. 16, 2014.
Office Action in U.S. Appl. No. 11/680,599, mailed Apr. 29, 2009.
Amendment and Response to Office Action in U.S. Appl. No. 11/680,599, filed Oct. 29, 2009.
Office Action in U.S. Appl. No. 11/680,599, mailed May 21, 2010.
Amendment and Response to Office Action in U.S. Appl. No. 11/680,599, filed Aug. 23, 2010.
Office Action in U.S. Appl. No. 11/680,599, mailed Jan. 5, 2011.
Amendment and Response to Office Action in U.S. Appl. No. 11/680,599, filed Aug. 3, 2011.
Office Action in U.S. Appl. No. 11/680,599, mailed Aug. 29, 2011.
Amendment and Response to Office Action in U.S. Appl. No. 11/680,599, filed Feb. 29, 2012.
Office Action in U.S. Appl. No. 11/680,599, mailed Apr. 30, 2012.
Amendment and Response to Office Action in U.S. Appl. No. 11/680,599, filed Oct. 30, 2012.
Office Action in U.S. Appl. No. 11/680,599, mailed Jul. 3, 2013.
Amendment and Response to Office Action in U.S. Appl. No. 11/680,599, filed Jan. 3, 2014.
Notice of Allowance in U.S. Appl. No. 11/680,599, mailed Apr. 30, 2014.
Office Action in U.S. Appl. No. 11/923,546, mailed Feb. 26, 2010.
Amendment and Response to Office Action in U.S. Appl. No. 11/923,546, filed Jun. 28, 2010.
Office Action in U.S. Appl. No. 11/923,546, mailed Aug. 2, 2010.
Amendment and Response to Office Action in U.S. Appl. No. 11/923,546, filed Dec. 2, 2010.
Office Action in U.S. Appl. No. 11/923,546, mailed Dec. 22, 2010.
Amendment and Response to Office Action in U.S. Appl. No. 11/923,546, filed Apr. 28, 2011.
Office Action in U.S. Appl. No. 11/923,546, mailed Jun. 3, 2011.
Amendment and Response to Office Action in U.S. Appl. No. 11/923,546, filed Apr. 5, 2012.
Office Action in U.S. Appl. No. 11/923,546, mailed Aug. 27, 2012.
Amendment and Response to Office Action in U.S. Appl. No. 11/923,546, filed Nov. 6, 2013.
Office Action in U.S. Appl. No. 11/923,546, mailed Jun. 6, 2013.
Amendment and Response to Office Action in U.S. Appl. No. 11/923,546, filed Feb. 27, 2013.
Office Action in U.S. Appl. No. 11/923,546, mailed Aug. 14, 2014.
Office Action in U.S. Appl. No. 12/130,171, mailed Apr. 1, 2011.
Amendment and Response to Office Action in U.S. Appl. No. 12/130,171, filed Aug. 1, 2011.
Office Action in U.S. Appl. No. 12/130,171, mailed Oct. 19, 2011.
Amendment and Response to Office Action in U.S. Appl. No. 12/130,171, filed Apr. 19, 2012.
Office Action in U.S. Appl. No. 12/130,171, mailed Aug. 15, 2012.
Amendment and Response to Office Action in U.S. Appl. No. 12/130,171, filed Feb. 15, 2013.
Office Action in U.S. Appl. No. 12/130,171, mailed May 28, 2013.
Amendment and Response to Office Action in U.S. Appl. No. 12/130,171, filed Nov. 27, 2013.
Office Action in U.S. Appl. No. 12/130,171, mailed Mar. 26, 2014.
Amendment and Response to Office Action in U.S. Appl. No. 12/130,171, filed Jul. 25, 2014.
Office Action in U.S. Appl. No. 12/130,171, mailed Sep. 25, 2014.
Office Action in U.S. Appl. No. 12/436,748, mailed Sep. 16, 2011.
Amendment and Response to Office Action in U.S. Appl. No. 12/436,748, filed Mar. 16, 2012.
Office Action in U.S. Appl. No. 12/436,748, mailed May 2, 2012.
Office Action in U.S. Appl. No. 12/476,205, mailed Oct. 12, 2011.
Amendment and Response to Office Action in U.S. Appl. No. 12/476,205, filed Apr. 12, 2012.
Office Action in U.S. Appl. No. 12/476,205, mailed Jul. 3, 2012.
Amendment and Response to Office Action in U.S. Appl. No. 12/476,205, filed Aug. 5, 2013.
Office Action in U.S. Appl. No. 12/610,202, mailed May 22, 2012.
Amendment and Response to Office Action in U.S. Appl. No. 12/610,202, filed Oct. 18, 2012.
Notice of Allowance in U.S. Appl. No. 12/610,202, mailed Dec. 10, 2012.
Office Action in U.S. Appl. No. 12/906,051, mailed Mar. 13, 2012.
Amendment and Response to Office Action in U.S. Appl. No. 12/906,051, filed Sep. 13, 2012.
Office Action in U.S. Appl. No. 12/906,051, mailed Oct. 2, 2012.

(56) References Cited

OTHER PUBLICATIONS

Amendment and Response to Office Action in U.S. Appl. No. 12/906,051, filed Apr. 2, 2013.
Office Action in U.S. Appl. No. 12/906,051, mailed Aug. 11, 2014.
International Search Report and Written Opinion for PCT Application No. PCT/US2006/14160, mailed Sep. 4, 2007.
Chinese First Office Action in Chinese Patent Application No. 200680025190.6, dated Sep. 11, 2009.
Chinese Second Office Action in Chinese Patent Application No. 200680025190.6, dated Jun. 3, 2010.
Japanese Office Action in Application No. 2008-511129 dated Jul. 26, 2011.
International Search Report and Written Opinion for PCT Application No. PCT/US2007/001335, mailed Feb. 12, 2008.
International Search Report and Written Opinion for PCT Application No. PCT/US2007/001694, mailed Feb. 14, 2008.
International Search Report and Written Opinion for PCT Application No. PCT/US2007/005504, mailed Jul. 29, 2008.
Applicant Initiated Interview Summary in U.S. Appl. No. 11/923,546, mailed Oct. 23, 2014.
Applicant Statement of the Substance of Interview (Summary of Interview with Examiner) in U.S. Appl. No. 11/923,546, mailed Nov. 24, 2014.
Office Action in U.S. Appl. No. 12/906,051, mailed Dec. 11, 2014.
Office Action in U.S. Appl. No. 14/017,123, mailed Oct. 23, 2014.
Final Office Action in U.S. Appl. No. 11/923,546, mailed Jun. 9, 2015.
Final Office Action in U.S. Appl. No. 12/130,171, mailed Jun. 24, 2015.
Office Action in U.S. Appl. No. 12/476,205, mailed Apr. 16, 2015.
Notice of Allowance in U.S. Appl. No. 12/906,051, mailed Jun. 19, 2015.
Office Action in U.S. Appl. No. 14/017,123, mailed Apr. 17, 2015.
Amendment and Response to Office Action in U.S. Appl. No. 11/923,546, filed Dec. 8, 2015.
Final Office Action in U.S. Appl. No. 11/923,546, mailed Jan. 25, 2016.
Amendment and Response to Office Action in U.S. Appl. No. 12/130,171, filed Sep. 24, 2015.
Office Action in U.S. Appl. No. 12/130,171 dated Oct. 23, 2015.
Amendment and Response to Office Action in U.S. Appl. No. 12/476,205, mailed Jul. 16, 2015.
Amendment and Response to Office Action in U.S. Appl. No. 14/017,123, filed Aug. 19, 2015.
Office Action in U.S. Appl. No. 12/476,205, mailed Mar. 10, 2016.
Office Action in U.S. Appl. No. 14/017,123, mailed Mar. 7, 2016.

\* cited by examiner

Domain-specific web neighborhood determination methodology

Context finding methodology in information web
neighborhood without seed information

SYSTEMS AND METHODS FOR CREATING, NAVIGATING, AND SEARCHING INFORMATIONAL WEB NEIGHBORHOODS

CROSS-REFERENCE TO RELATED APPLICATIONS

The present application is a continuation of U.S. patent application Ser. No. 11/625,279 dated Jan. 19, 2007, titled "Systems And Methods For Creating, Navigating, And Searching Informational Web Neighborhoods," which claims benefit of priority from U.S. Provisional Patent Application Ser. No. 60/761,011 titled "Method And Apparatus for Creating, Navigating, and Searching Informational Web Neighborhoods," filed Jan. 19, 2006, the contents of which are incorporated herein by reference and for all purposes.

BACKGROUND OF THE INVENTION

1. Field of the Invention

The present invention relates generally to methods for analyzing relational systems where nodes have local interactions or links, and more particularly to methods for analyzing linked databases.

2. Description of Related Art

The World Wide Web comprises a heterogeneous complex network with potentially billions of nodes and edges that link these nodes or URLs together. The large-scale, time-varying, heterogeneous and unstructured nature of the web, make it a very difficult database from which to extract meaningful and desired information. The web does share a few similarities with conventional linked databases. Conventional linked databases can also be represented as a network comprising different classes of objects that can be characterized as nodes, whereas, in the case of the web, nodes are URLs or specific web sites. Conventional linked databases also include links connecting nodes and relationships among objects of linked databases may be regarded as equivalent to the hyperlinks of the web which are used to link to other web sites. However, the web is very noisy and lacks accurate annotation, which makes its exploration particularly difficult. In a conventional linked database, the nodes as well as the edges are annotated with meta-information, which describe various attributes of both the objects and the nature of their relationships. For example, for an edge or link, such meta-information might include a description of the underlying relationship (e.g., father, son, wife, girlfriend, partner etc.) and its strength (e.g., frequency of contacts), time stamps describing when such a relationship was established, and, if applicable, when it is set to expire, and perhaps even geographical location of the relationship. In the case of web, however, such annotation for the nodes and links are lacking cannot be easily inferred. A web page might link to another page for a variety of reasons that cannot be always deduced from the content of the web page itself. Similarly, while it is relatively easy to identify the purpose of certain web pages (for example, a manufacturer of a particular product or a corporation usually has a well-organized web page that clearly states its products and services, partners, management team, location etc.) and create an accurate annotation, an accurate determination of its purpose, objectives, and relevance has proven to be a difficult task to accomplish for most web pages. Often, the relevance of both the content of a page, as well as its links, depends on the type of information that one is interested in. Thus, while the web is a networked information system comprising nodes and links, it has proven to be a very difficult problem to accurately extract meta-information for the nodes and edges, and it remains a difficult system to infer relevant information from.

Most existing search engines deal with this challenging task of organizing and extracting information from the web by performing three critical tasks: (i) crawling the whole web, (ii) indexing the content of each page by making a list of words and terms that appear in each page along with a relevance index (e.g., where in the text the words appear and in what font size), and (iii) calculating the relevancy, trustworthiness, or the importance of a given page, as determined by the link structure of the web. These tasks yield a measurement known as the page rank. Page rank attempts to determine how many "important" pages link to a given page, where importance or "page rank" is computed in a self-consistent manner. Thus, for a page to have a high rank, a lot of pages with relatively high rank must link to it. These steps allow search engines to support Boolean searches. All pages that match a query are returned as part of a list, which is sorted based on their page rank, and the strength or relevancy with which the key words in the query appear in the page. Sometimes, engines use fees paid by the owner of a page to determine its location in the sorted list if the query involves commercial products. If a user wants further information, then the user must look up a number of these pages, formulate hypotheses about what is important, and navigate the web by trial and error. For example, a query directed to a company's web presence, in the sense of what types of individuals and news organizations are reporting on the company and who they represent, and if they are relevant or important to the company, then there are no easy key words to get this information; an exhaustive search may be required with different key words followed by much manual post-processing in order to infer such information. Even then, only those individuals or organizations having directly reported on the company may be discovered, and it may be difficult to find other individuals and organizations that are closely related to these direct reporters. Such information is embedded in the underlying network but not accessible via key-words-based searches.

Conventional search engine technologies support keywords based search capability, where all web pages satisfying a Boolean query are returned as a sorted list. The list is sorted according to a relevancy score, which, in turn, is computed by combining a number of relevancy factors, including the page rank of a page as determined from the global link structure of the web, the relevancy with which the key words are present in the page, and based on an amount the related company is willing to pay for its page to be included at the top of the list. This list could be very long and is identical for the same set of key words and for all users. A user usually must explore this list by trial and error, and such exploration is complicated because the user often has only a vague idea of what is being sought.

Conventional search engines flatten the web of relationships, and convert the underlying complex network to one-dimensional lists. Relevancies of different documents are determined by the search engine in a linear fashion, and the search results are not organized in a fashion to make further explorations more meaningful. All users with the same keywords receive the same set of documents, and any feedback from the user is in the form of trial and error, and via modifications of Boolean expressions.

Recently, attempts have been made to devise methods for returning pages that are "relevant" to a particular page requested by a user, or for returning pages that are relevant to a query. In order to determine such relevant pages and compute their relevancies, these methods use a combination of page rank and semantic similarities. For example, the exact neighborhood network (n-network) of a relevant page is processed in an attempt to identify pages that are semantically similar in content to the initial page. The primary limitations of these systems include: (i) the n-network of a node can easily become too large to be fetched and processed in a meaningful way, thus restricting the exploration of pages to those that are at most 2 or 3 hops away from the initial node; (ii) the so-called "important" nodes in these networks are determined by an analysis of their degrees, which could be very misleading when it comes to the relevance of a page to the original query; and (iii) there is no reason for all these pages in the n-network to have a common semantic theme, making the processing of contents of these pages difficult and prone to errors. These methods provide incremental extensions of the predominant existing method for organizing information from the web. Such methods provide linear search results, and reduce the complexity of the web by representing it in terms of tables and linear lists. Hence, there is a need for methods to obtain a networked representation of the web that captures the complex informational relationships among the pages, and organizes the information content of a page with respect to the contents of other related web pages.

BRIEF SUMMARY OF THE INVENTION

Certain embodiments of the invention, methods are provided that extract structural communities that are relevant to, or closely associated with the general concepts provided at the outset. The structural communities can include clusters of pages that are strongly connected to each other by hyperlinks. In certain embodiments, content may be partitioned into clusters or contexts automatically and statistically significant concepts may be generated for each context and cluster. Moreover, a generally hierarchical neighborhood structure can be determined, where higher-level neighborhoods can be subdivided into finer-grained sub-communities. Membership of pages in a shared structural community may provide contexts within which the contents of these pages can be interpreted and semantically processed.

In certain embodiments, specialized webs can be created. For instance, a business web can be created from a starting point of a general description of particular business sectors, including major companies in the sector, names of retailers, related technologies, etc. Descriptive lists can serve as initial seed information and can be obtained from a variety of sources. In certain embodiments, a multi-resolution and multi-dimensional network of informational neighborhoods can be created, wherein each neighborhood comprises one or more desired business related entities. In certain embodiments, the process can be repeated iteratively to obtain a hierarchical multi-resolution structure and network. In certain embodiments, such processes can be employed to construct different types of webs, including financial, music, entertainment and sports webs.

Certain embodiments provide a multi-resolution and multi-dimensional informational search tool for the web and may enable informational exploration of the web. A user can provide a set of seed information, comprising key words, initial links, and names of related objects or organizations. This seed information can be processed to generate a set of seed nodes around which the informational neighborhoods are formed and expanded. In certain embodiments, a multi-resolution and multi-dimensional network of communities of web pages may be returned whereby each community can be labeled with a set of words and concepts and can be embedded in a hierarchical structure. In certain embodiments, the informational landscape can be further explored by the user, thereby putting the user in charge of the search process. In certain embodiments, searches performed by individuals can be accumulated and integrated into a common database, so that the informational neighborhoods derived from each query can be used to generate a cumulative informational web neighborhood.

In certain embodiments, the whole web can be partitioned into multi-scale and hierarchical sets of overlapping contexts and communities. In some of these embodiments, a combination of percolation crawl and structured community finding algorithms is employed for such partitioning. Communities and contexts can be indexed, and concepts can be automatically extracted. In certain embodiments, communities and contents may be inverse indexed such that a key word or a concept can be assigned and an inverted index returns all communities and contents, typically sorted according to relevance scores. In certain embodiments, this search may return a rendition of the web in terms of contexts.

Certain embodiments identify and analyze temporal dynamics of the relationships among objects and concepts represented in the informational web neighborhoods. By analyzing the archived webs, informational neighborhoods can be derived at different times and compared to determine whether significant changes have occurred. Such dynamical analyses can provide both predictive tools for estimating likelihoods of impending shifts in the structure of certain sectors, as well as, investigative research tools to determine potential factors that could have led to a particular set of observed changes.

DETAILED DESCRIPTION OF THE INVENTION

Figure 1:
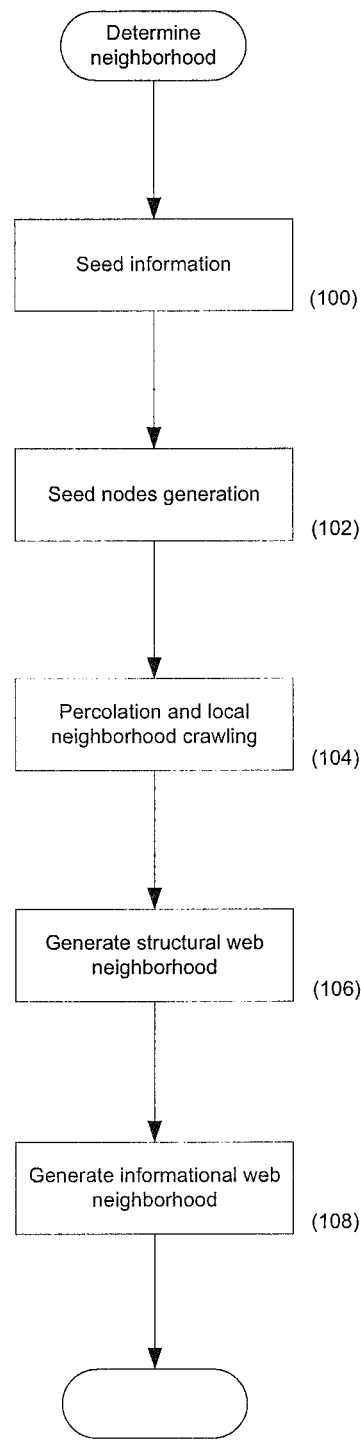
FIG. 1 is a flowchart illustrating a process for determining domain-specific web neighborhood in one embodiment of the invention.

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the components referred to herein by way of illustration.

Throughout this document web, and content, and node are used interchangeably and any method defined can be used on any digital content. Moreover, informational web neighborhood is used in relation to categorizing and exploring any digital content network.

Certain embodiments of the invention simultaneously exploit the link structure of web pages, and the semantic and organization structures of content of web pages to construct a multi-dimensional and multi-resolution network. For example, each community can represent a closely-knit cluster of nodes on the web, in terms of web links, and the contents of the nodes in each community can be processed to annotate them with their shared attributes and concepts.

In certain embodiments, content can be automatically partitioned into clusters and contexts, and statistically significant concepts can be generated for each context and cluster. In certain embodiments, clusters and contexts can be automatically generated without the specification of seed nodes. Certain embodiments provide a neighborhood structure that may be generally hierarchical such that a higher-level neighborhood can be subdivided into finer-grained sub-communities. In certain embodiments, contexts can be derived based on membership of pages in a shared structural community and the content of pages can be interpreted and semantically processed within the contexts.

In certain embodiments, methods are provided for extracting multi-resolution and multi-dimensional representations of the information content of web pages. Certain embodiments receive an input comprising a general description of the category of information sought, as expressed in terms of key words, important web sites, and related individuals and organizations. Based on the input, the web can be mined to generate a network of overlapping neighborhoods or communities of web pages and objects, where the neighborhoods typically represent pages or objects that share a common set of intents, purposes and associations. Each neighborhood can be semantically tagged with a set of words and concepts determined by the contents of the web pages. An initial description of the general objects and concepts can be provided as seed information. Seed information is typically associated with the informational web neighborhoods that are to be created and the seed information can be processed to determine a set of seed nodes in the web. The informational neighborhoods can be built and expanded around the seed nodes. Moreover, overlaps among the neighborhoods and the hierarchical structure of the network can capture complex relationships among the concepts represented by the corresponding informational neighborhoods. Thus, a multi-resolution and multi-dimensional networked view of the informational neighborhoods or communities embedded in the web can be obtained.

In certain embodiments, the link structure of the web pages, and the semantic and organization structures of the content of the web pages can be simultaneously exploited to construct a multi-dimensional and multi-resolution network. For example, each community may represent a closely-knit cluster of nodes on the web in terms of web links, and the contents of the nodes in each community can be processed to provide annotations that include corresponding shared attributes and concepts. Typically, structural communities are extracted that are relevant to, or closely associated with general predetermined concepts, or seed information, provided at the outset. Structural communities typically include clusters of pages that are strongly connected to each other, as indicated for example, by one or more hyperlinks. A neighborhood structure can be derived that is generally hierarchical.

Information related to membership of a page in a shared structural community can be used to provide contexts within which to interpret and semantically process the contents of the page. Possible contexts within which the content of a page is to be interpreted may be determinable from links to other pages, since these links can be expressive of intentions of an author with regard to the page. In one example, a sporting goods page dealing with golf equipment may provide links to major golf club manufacturers and leading golf players. The decision to provide such links can lead to the emergence of a community or neighborhood, having one or more different shared attributes. In the latter example, most pages in a community may be associated with sports-related products, activities or reporting. More particularly, pages in the community can possess the commonality of being tied to the sport of golf. Identification of community structures to which a page belongs can further reinforce and distill contexts used for semantic processing: i.e., pages may be assumed to be part of a shared relevant informational unit where many pages are closely knit together by, for example, their hyperlinks. A page can belong to multiple overlapping communities, allowing it to have different semantic tags.

Effective and accurate semantic processing of page contents can be challenging in the absence of contextual information such as that provided by the structural neighborhoods. However, certain embodiments provide a local method of percolation crawl and community finding that offers a scalable solution to the otherwise daunting task of finding informational neighborhoods. FIG. 1 includes a flowchart illustrating a process for determining domain-specific web neighborhood in one embodiment of the invention. At step 100, seed information may be received where the seed information delineates the scope of the web neighborhood to be determined. Seed information may take various forms, including: names of companies, individuals or organizations, names of competitors or related industries, general key words describing the field of knowledge or expertise and specific web sites identified as potentially relevant. In certain embodiments, at least some of the seed information may be derived from seed information obtained a database, website or other appropriate source of information.

At step 102, seed nodes may be generated from the seed information provided by the user. Seed information can be processed to generate a set of seed nodes that may include web pages that can serve as centers around which local community finding algorithms can be implemented. Generation of seed nodes can comprise various steps generated, including:

(i) the performance of key word based searches using user-provided information and search engines to identify relevant sites;
(ii) the performance off semantic analysis and indexing information, page-rank or related structural information to obtain a list of seed nodes; and
(iii) the removal of noise by vetting intermediate lists of candidate nodes and based on feedback received from one or more users concerning the relevancy of some of these automatically generated seed nodes.

At step 104, an annotated linked network, with meta-information for nodes and edges can be constructed using percolation and local neighborhood crawling. Starting at one or more of the seed nodes, and by following reference links in and out of the seed nodes, a percolation crawl may be performed to construct networks that are most relevant to the one or more seed nodes. In at least some embodiments, a combination of percolation and deterministic crawls may be used. As new sites and nodes are accessed, semantic analysis on the content of the sites and nodes can be performed to determine its relevance to other sites and nodes and to identify the type of relevance to the other sites and nodes. In some instances, a site or node discovered to have a relevance below an expected or otherwise predetermined threshold may be discarded. Where relevance is discovered that exceeds such threshold, the site or node can be annotated using key words and other information including information associated with the node and its associated links. Additionally, links to and from the site or node can be annotated using descriptions, indicators, and other characteristics of the types of relationships between end nodes. Typically, percolation and local neighborhood crawling may be performed using customized, configured or specially-developed percolation and probabilistic crawlers.

The following discussion is provided to assist in understanding some of the differences between conventional crawlers and probabilistic crawlers as implemented in certain embodiments of the invention. Conventional deterministic web crawlers operate as follows:

(a) Create a database D populated with pre-selected unfetched web pages,
(b) Generate a list L of unfetched web pages in D.
(c) Fetch each web page W from L into D. Add all those web pages to D to which W links to (outlinks). This step defines deterministic crawlers.
(d) Assign a score to W after examining the number of existing web pages that link to it (inlinks), and
(e) repeat steps (b)-(d).

In certain embodiments of the present invention, a probabilistic crawler randomly selects links to fetch in and out of a fetched web page. Thus, some of the links may originate in the fetched page and terminate on a page other than the fetched page (out-link) while other links may terminate on the fetched page having originated somewhere other than the fetched page (in-link). It will be appreciated that a difference between the deterministic crawler and the probabilistic crawler is that the deterministic crawler adds every out-link of a fetched page to the database, whereas a probabilistic crawler typically adds out-links probabilistically. More particularly, every out-link has an equal probability, p, of being added to the database. A probabilistic crawler may also add in-links of a given web page to the database. The in-links are chosen from a number "M" of in-links, according to a probability 'r'. The parameters, "p," "M," and "r" can be specified by the user. It will be appreciated that a probabilistic crawler can be caused to operate as a deterministic crawler by configuration and appropriate specification of these parameters.

At step 106, an annotated linked network, organized into a multi-resolution and multidimensional community structure may be produced. This structural web neighborhood can be constructed using community clustering of the crawled and annotated network. Communities discovered to have certain structural properties can be investigated and can be removed where necessary or otherwise indicated. In one example, very highly-clustered small communities often represent "noise" or content that is related to spam.

At step 108, an informational web neighborhood can be constructed. Typically, text mining tools can be used to assign a bag or set of concepts to each structural community. Any suitable or preferred text mining tool may be used, including latent semantic indexing tools and other natural language processing tools. Typically, each site and link can be associated with a set of index terms and semantic processing may be applied to these terms to obtain informational tags for the communities. Additionally, types of relationships among the communities can be annotated. Each community can be associated with multiple concept tags, each having a corresponding confidence level.

Figure 3:
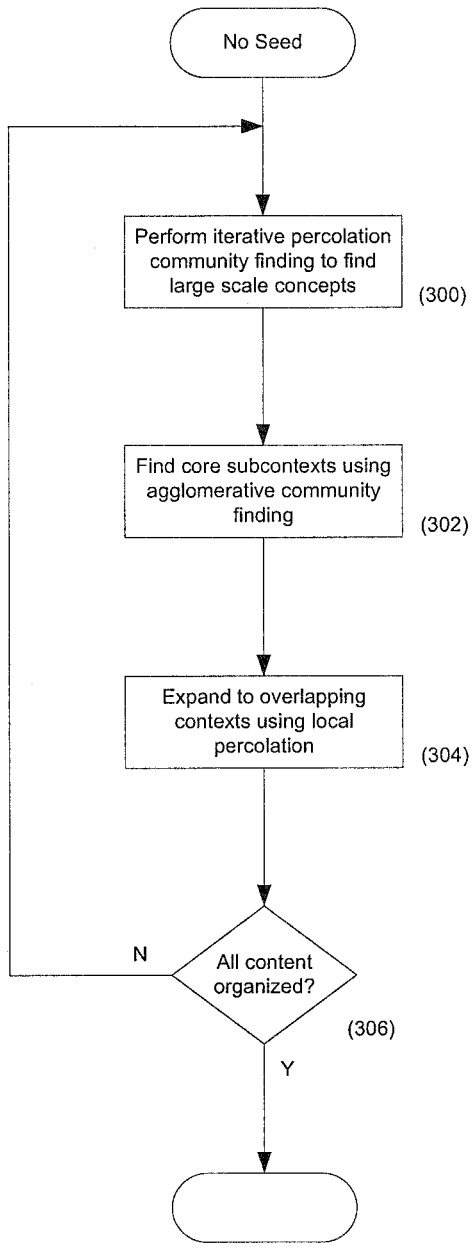
FIG. 3 is a flowchart of a process in one embodiment that determines an information web neighborhood without seed information.

FIG. 3 provides an example of context finding that can be performed on contents related to one or more generated high level informational neighborhoods. Context finding may include a plurality of steps that divide contents into overlapping contexts based on their semantic and structural relevance to a particular topic. The method may include variations of percolation community finding and regular agglomerative community finding at different levels. At different levels, a combination of these methods can be used to generate a hierarchy of overlapping context.

At step 300, large scale contexts can be found using iterative percolation community finding. Percolation community finding provides methods for finding large overlapping communities in a distributed manner. A global community finding as described in U.S. patent application Ser. No. 11/125,329 by Muntz et al., titled "Method and apparatus for distributed community finding," and filed May 10, 2005 ("the '329 application") and incorporated herein by reference, can be used to find large scale communities. A combination of percolation community finding (step 300) and agglomerative community finding methods (step 302) can be used to generate sub-contexts at various resolutions. Local percolation can be started from seed nodes at step 304 in order to expand into overlapping contexts. At step 306, these steps and processes may be repeated until the contents are organized as a plurality of overlapping contexts.

Figure 2:
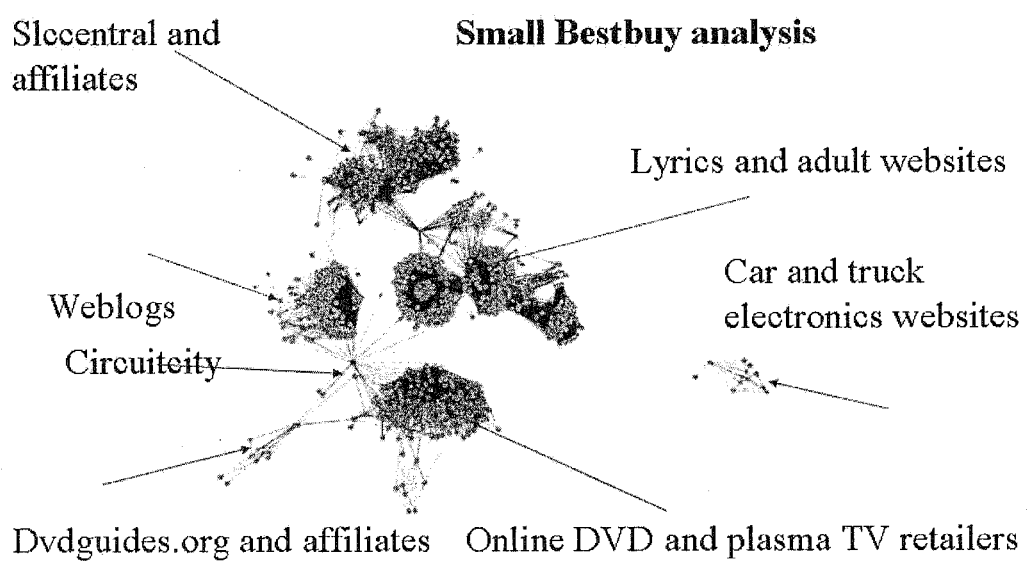
FIG. 2 is an example of a visualized informational web neighborhood.

The diagram of FIG. 2 is a visualization of an informational web-neighborhood in certain embodiments of the invention. In the diagram, the visualized neighborhood starts at the seed information "BestBuy.com." Different contexts and community characterizations are marked on the diagram. Each of the communities can typically be associated with a definite context. In certain embodiments, the neighborhood may identify one or more close competitors of Best Buy; in the example, "Circuit City" might be identified as such a competitor.

In certain embodiments, the methodologies described above can be applied to generate specialized webs including business webs, industry-specific webs and music webs. Seed nodes can be generated using "directory pages" or any available database or data source. For example, specialized and expert databases such as Hoover, Dunn and Bradstreet, and EDGAR (SEC filings) can be used to list all related companies, their products, management teams, financial information, etc. Results obtained from these sources can be parsed to generate categorized data and predefined concepts, which can be used as effective information.

In certain embodiments of the invention, a complete linked-database can be iteratively partitioned into multi-scale and multi-resolution sets of overlapping neighborhoods. Each such structural neighborhood can then be processed to obtain concepts and summaries as described in the '329 application. The communities and contents may then be reverse indexed to obtain search results for any query.

In one example, methodologies and systems provided in certain embodiments can be used for partitioning pages in the World Wide Web into a set of multi-scale and multi-resolution collections of potentially overlapping neighborhoods and contexts. The neighborhoods can be particularized to selected domains in order to generate domain-specific webs such as business web or a music web. Aspects of the invention provide methodologies for generating information neighborhoods and for automatically providing conceptual characterizations of the information neighborhoods, without any seed information. These contexts can then be used to search and navigate the web at the knowledge level.

In certain embodiments, a multi-resolution and multi-dimensional informational search tool for the web is provided that can be used for informational exploration of the web. Typically, a user provides a set of seed information, comprising key words, initial links, and names of related objects or organizations. This seed information can be processed to generate a set of seed nodes around which the informational neighborhoods are formed and expanded. A multi-resolution and multi-dimensional network of communities of web pages is typically returned, where each community may be labeled with a set of words and concepts and may be embedded in a hierarchical structure. In one example, a query related to a particular drug would typically return a list of web pages including the drug's name in its content, as well as a network, where the information is organized in terms of communities of web pages. Typically, each community is labeled with common concepts and relevancies. In the example, a neighborhood structure may be returned comprising pharmaceutical companies that manufacture the drug and their competitors, Federal Drug Administration (FDA) information about the drug and related medications, drug trials, major institutes at which drug trials were conducted, news releases about the drug, alternate or competing drugs, user evaluations and reports. This informational landscape can then be explored further by the user, such that the user controls the search process.

In certain embodiments, searches performed by individuals can be accumulated and integrated into a common database, so that the informational neighborhoods derived from each query can be used to generate a cumulative informational web neighborhood.

In certain embodiments, partitioning of web pages can be performed in the absence of a user generated query and the entire web can be partitioned into multi-scale, hierarchical sets of overlapping contexts and communities. Partitioning may be accomplished using a combination of percolation crawl and structured community finding algorithms. Communities and contexts can then be indexed, and concepts can be automatically extracted as described, for example, in the '329 application. Concepts extracted according to the '674 application can be characterized as patterns of terms. Communities and contents can be inverted indexed whereby the inverted index returns all communities and contents based on a key word or a concept, whereby results are typically sorted according to the relevance scores that "match" a submitted query. Thus, one result of such searching is a rendition of the web in terms of contexts which will include contents that do not directly match the queried for keywords.

In certain embodiments, informational web neighborhoods can be determined and temporal dynamics of the relationships among objects and concepts represented in the informational web neighborhoods can be identified and analyzed. By analyzing archived webs, the informational neighborhoods can be derived at different times and these temporally displaced derivations can be compared to identify significant changes that may have occurred from one period to another. For example, by tracking the structure of the business web, one would be able to identify any major shift in alliances, or the emergence of a new industry or a business sector, or major upheavals in an existing industry or in a particular corporation. Such dynamical analyses can provide both predictive tools for estimating likelihoods of impending shifts in the structure of certain sectors, as well as, investigative research tools to determine potential factors that could have led to a particular set of observed changes.

In certain embodiments, informational web neighborhoods can be combined with temporal traffic, click-through, page view, and other usage information of the WebPages and advertisement or prepaid leads, to analyze the flow of traffic, click-through and optimize the ad and lead generation strategy using different statistical techniques. For example, Best Buy can analyze the traffic incoming from a group or sector of informational neighborhood such as blogs—to their competitor (Circuit City), and can provide incentives to attract more traffic from this group to Best Buy. Furthermore, measured temporal traffic and other changes in web neighborhoods and communities can be used to analyze the effectiveness of an online advertisement or lead generation campaign and optimize the selection of sectors and WebPages to choose the advertisement or lead generation. where advertisement can be any kind of advertisement, including but not limited to banner ads, CPC ads, text ads, flash ads or any other paid listing and lead generation includes any paid or unpaid in-link to the destination website. Additional Descriptions of Certain Aspects of the Invention Certain embodiments of the invention provide a method for determining a domain-specific network neighborhood, comprising generating seed nodes from seed information, and constructing an annotated linked network around the seed nodes, wherein the linked network includes nodes and edges represented by meta-information. In some of these embodiments, the seed nodes delineate the scope of the web neighborhood to be determined. In some of these embodiments, a portion of the seed information is received from a user. In some of these embodiments, the seed information includes one or more names of companies, individuals, organizations competitors. In some of these embodiments, the seed information identifies two or more related industries. In some of these embodiments, the seed information includes key words. In some of these embodiments, the seed information identifies a web site. In some of these embodiments, constructing includes performing percolation crawling. In some of these embodiments, percolation crawling includes the steps of selecting a seed node, following links between the selected seed node and one or more neighboring nodes, and performing semantic analysis of contents of the one or more neighboring nodes. In some of these embodiments, percolation crawling includes determining relevance of the one or more neighboring nodes based on the semantic analysis. In some of these embodiments, percolation crawling includes determining a type of relevance of the one or more neighboring nodes based on the semantic analysis. In some of these embodiments, percolation and local neighborhood crawling includes selectively discarding selected ones of the one or more neighboring nodes based on the relevance and type of relevance of the selected ones. In some of these embodiments, at least one of the links originates at one of the neighboring nodes. In some of these embodiments, seed nodes are automatically derived from an information source. In some of these embodiments, the semantic analysis identifies a plurality of concepts in the one or more neighboring nodes. In some of these embodiments, the plurality of concepts includes concepts identified from patterns of terms in the contents. In some of these embodiments, a plurality of includes predefined concepts associated with certain of the nodes. In some of these embodiments, the step of determining relevance includes matching one or more of the plurality of concepts with a set of concepts associated with the domain-specific network neighborhood.

Certain embodiments of the invention provide a network neighborhood comprising a community including a cluster of related network nodes, and a set of annotated relationships connecting different ones of the related network nodes, wherein the community is assigned a plurality of concepts and each of the related network nodes includes terms associated with at least one of the plurality of concepts. In some of these embodiments, each neighborhood comprises one or more business related entities. In some of these embodiments, certain of the plurality of concepts are assigned using a text mining tool. In some of these embodiments, the text mining tool is a latent semantic indexing tool. In some of these embodiments, the text mining tool is a natural language processing tool. In some of these embodiments, certain of the plurality of concepts are derived from semantic processing of the terms. In some of these embodiments, the text mining tool is a natural language processing tool. In some of these embodiments, the cluster of nodes is related by business sector.

Certain embodiments of the invention provide a method for conducting an informational search, comprising receiving seed information from a user, generating seed nodes from the seed information, and identifying a community of linked network nodes associated with a set of concepts, wherein each node is related to the community by at least one of the set of concepts. In some of these embodiments, the information includes a key word. In some of these embodiments, the information includes an initial link to one of the nodes. In some of these embodiments, the information includes a name. In some of these embodiments, the community is embedded in a hierarchy of communities based on a set terms associated with the community. In some of these embodiments, the community is maintained in a database with one or more other communities. In some of these embodiments, the database is configured to maintain a cumulative informational network neighborhood comprising the community and the one or more other communities. In some of these embodiments, the one or more other communities represent a temporal series of communities obtained by repeating an informational search at intervals over a period of time. Some of these embodiments also comprise analyzing the temporal series of communities to determine changes between communities in the series. In some of these embodiments, the changes are predictive of impending shifts in a business sector. In some of these embodiments, the changes include changes indicative of visitations to the community.

Certain embodiments of the invention provide a computer implemented method, comprising the steps of maintaining an informational network neighborhood including a community of linked network nodes, wherein each node includes one more concepts associated with the community, identifying changes in the informational network neighborhood by repetitively conducting an informational search at desired time intervals, and providing information indicative of activity in the informational network neighborhood. In some of these embodiments, the activity corresponds to visitation of nodes within the community. In some of these embodiments, the activity represents network traffic directed to the community. Some of these embodiments also comprise placing advertisements in one or more of the linked network nodes based on the activity. Some of these embodiments also comprise generating contact lists based on the activity, the contact lists including information derived from one or more of the linked network nodes. In some of these embodiments, the informational network neighborhood includes a plurality of communities. In some of these embodiments, the activity includes network traffic measurements corresponding to visitations to nodes in each of the plurality of communities. Some of these embodiments also comprise placing advertisements in one of the plurality of communities, the one community being selected based on the network traffic measurements. Some of these embodiments also comprise generating contact lists based on the activity, the contact lists including information derived from one of the plurality of communities, the one community being selected based on the network traffic measurements.

Although the present invention has been described with reference to specific exemplary embodiments, it will be evident to one of ordinary skill in the art that various modifications and changes may be made to these embodiments without departing from the broader spirit and scope of the invention. Accordingly, the specification and drawings are to be regarded in an illustrative rather than a restrictive sense.

What is claimed is:

1. A computer implemented method, the method comprising:
    performing probabilistic percolation crawling from one or more web pages, wherein the one or more web pages comprise one or more reference links, and wherein performing probabilistic percolation crawling comprises following the one or more reference links in and out of the one or more web pages to one or more neighboring nodes probabilistically, wherein performing percolation crawling further comprises randomly selecting reference links in and out of the web page and in and out of the one or more neighboring nodes, wherein selected reference out-links are added to a linked database when the link satisfies a first probability and selected reference in-links are added to the linked database when the link satisfies a second probability; and
    generating a structural web community neighborhood based on the percolation crawling from the at least one of the one or more web pages by iteratively partitioning the linked database into overlapping communities, the structured web community neighborhood comprising a plurality of communities of network nodes linked by edges around the one of the web pages, each of the plurality of communities comprising a set of network nodes that are more linked amongst themselves than to network nodes that are not included in the community.

2. The method of claim 1, further comprising annotating each of the plurality of communities of network nodes in the structural web community with a concept.

3. The method of claim 2 further comprising storing the annotated structural web neighborhood.

4. The method of claim 1 further comprising performing semantic analysis of contents of the one or more neighboring nodes.

5. The method of claim 4 further comprising determining relevance of the one or more neighboring nodes based at least in part on the semantic analysis.

6. The method of claim 5 further comprising determining a type of relevance of the one or more neighboring nodes based at least in part on the semantic analysis.

7. The method of claim 6 further comprising selectively discarding selected ones of the one or more neighboring nodes based on the relevance and type of relevance of the selected ones.

8. The method of claim 1 wherein at least one of the links originates at one of the neighboring nodes.

9. The method of claim 8 wherein the semantic analysis identifies a plurality of concepts in the one or more neighboring nodes.

10. The method of claim 9 wherein the plurality of concepts comprises concepts identified from patterns of terms in the contents of the one or more neighboring nodes.

11. The method of claim 9 wherein the plurality of concepts comprises predefined concepts associated with certain of the nodes.

12. The method of claim 9, wherein relevance is determined by matching one or more of the plurality of concepts with a set of concepts associated with the structural web community neighborhood.

13. The method of claim 1, further comprising:
performing a semantic analysis to determine a relevance of a neighboring node to at least one other neighboring node; and
if the relevance of the network node exceeds a threshold, associating the neighboring node with the at least one other neighboring node to form one of the plurality of communities.

14. An informational network neighborhood comprising:
a memory configured to store a representation of a structured web community neighborhood within a network of linked nodes, the structured web community neighborhood comprising a plurality of communities of network nodes linked by edges around a web page, and wherein the web page and the set of network nodes comprise one or more reference links, each of the plurality of communities comprising a set of network nodes that are more linked amongst themselves than to network nodes that are not included in the community based on an analysis of the one or more reference links of the web page and the set of network nodes; and
a processor configured to perform probabilistic percolation crawling to construct the structured web community neighborhood, wherein performing probabilistic percolation crawling comprises following the one or more reference links in and out of the one or more web pages to one or more network nodes probabilistically, wherein performing percolation crawling further comprises randomly selecting reference links in and out of the web page and in and out of the one or more neighboring nodes, wherein selected reference out-links are added to a linked database when the link satisfies a first probability and selected reference in-links are added to the linked database when the link satisfies a second probability.

15. The informational network neighborhood of claim 14 wherein the processor is further configured to generate the structural web community based on the percolation crawling by iteratively partitioning the linked database into overlapping communities.

16. The informational network neighborhood of claim 14 wherein the processor is further configured to assign a concept to each community based at least in part on a semantic analysis of the community.

17. The informational network neighborhood of claim 16 wherein at least one concept is assigned using a text mining tool.

18. The informational network neighborhood of claim 17 wherein the text mining tool is selected from the group consisting of a latent semantic indexing tool and a natural language processing tool.

19. A computer implemented method for conducting an informational search, the method comprising:
identifying a community of linked network nodes associated with a set of concepts using probabilistic percolation crawling from a web page, wherein performing probabilistic percolation crawling comprises following the one or more reference links in and out of the one or more web pages to one or more neighboring nodes probablistically, wherein performing percolation crawling further comprises randomly selecting reference links in and out of the web page and in and out of the one or more neighboring nodes, wherein selected reference out-links are added to the community when the link satisfies a first probability and selected reference in-links are added to the community when the link satisfies a second probability and wherein each node is related to the community by at least one of the set of concepts; and
annotating the community with a community concept.

20. The method of claim 19 wherein the community is maintained in a database with one or more other communities.

21. The method of claim 20 wherein the database is configured to maintain a cumulative informational network neighborhood comprising the community and the one or more other communities.

22. The method of claim 19, further comprising:
performing a semantic analysis to determine a relevance of a neighboring node to at least one other neighboring node; and
if the relevance of the neighboring node exceeds a threshold, associating the neighboring node with the at least one other neighboring node to form the community.

* * * * *